(12) United States Patent
Kumar et al.

(10) Patent No.: US 8,578,201 B2
(45) Date of Patent: Nov. 5, 2013

(54) CONVERSION OF TIMESTAMPS BETWEEN MULTIPLE ENTITIES WITHIN A COMPUTING SYSTEM

(71) Applicant: International Business Machines Corporation, Armonk, NY (US)

(72) Inventors: Aditya Kumar, Austin, TX (US); Kevin Wendzel, Rochester, MN (US); Alwood P. Williams, III, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/684,555

(22) Filed: Nov. 25, 2012

(65) Prior Publication Data

US 2013/0080818 A1  Mar. 28, 2013

Related U.S. Application Data

(63) Continuation of application No. 13/087,106, filed on Apr. 14, 2011.

(51) Int. Cl.
*G06F 1/00* (2006.01)
*G06F 1/04* (2006.01)
*G06F 1/12* (2006.01)

(52) U.S. Cl.
USPC .............................. 713/503; 713/400; 713/500

(58) Field of Classification Search
None
See application file for complete search history.

(56) References Cited

U.S. PATENT DOCUMENTS

| | | | | |
|---|---|---|---|---|
| 5,826,066 | A * | 10/1998 | Jardine et al. | 713/400 |
| 2006/0069786 | A1 * | 3/2006 | Mogul et al. | 709/229 |
| 2010/0223241 | A1 * | 9/2010 | Hussain et al. | 707/700 |
| 2010/0280855 | A1 * | 11/2010 | Gupta | 705/7 |
| 2011/0276648 | A1 * | 11/2011 | Soldan | 709/208 |

OTHER PUBLICATIONS

Theta Engineering, Measuring Elapsed Time with Counters that Wrap, Apr. 4, 2010, http://web.archive.org/web/20100404055853/http://www.thetaeng.com/TimerWrap.htm.*
U.S. Appl. No. 13/087,106, entitled Conversion of Timestamps Between Multiple Entities Within a Computing System, filed Apr. 14, 2011.

* cited by examiner

*Primary Examiner* — Kim Huynh
*Assistant Examiner* — Vincent Chang
(74) *Attorney, Agent, or Firm* — Patterson & Sheridan LLP

(57) ABSTRACT

Method is described for converting received timestamps to a time-recording standard recognized by the receiving computing system. Embodiments of the invention generally include receiving data from an external device that includes a timestamp. If the received data is the first communication from the external device, creating a time base used for converting subsequently received timestamps to a recognized standard. Moreover, the system updates the time base if a counter failure at the external device is detected. When the external device transmits subsequent data, the time base is added to the subsequently received timestamps to convert the subsequent timestamps to a time-recording standard recognized by the computing system.

7 Claims, 6 Drawing Sheets

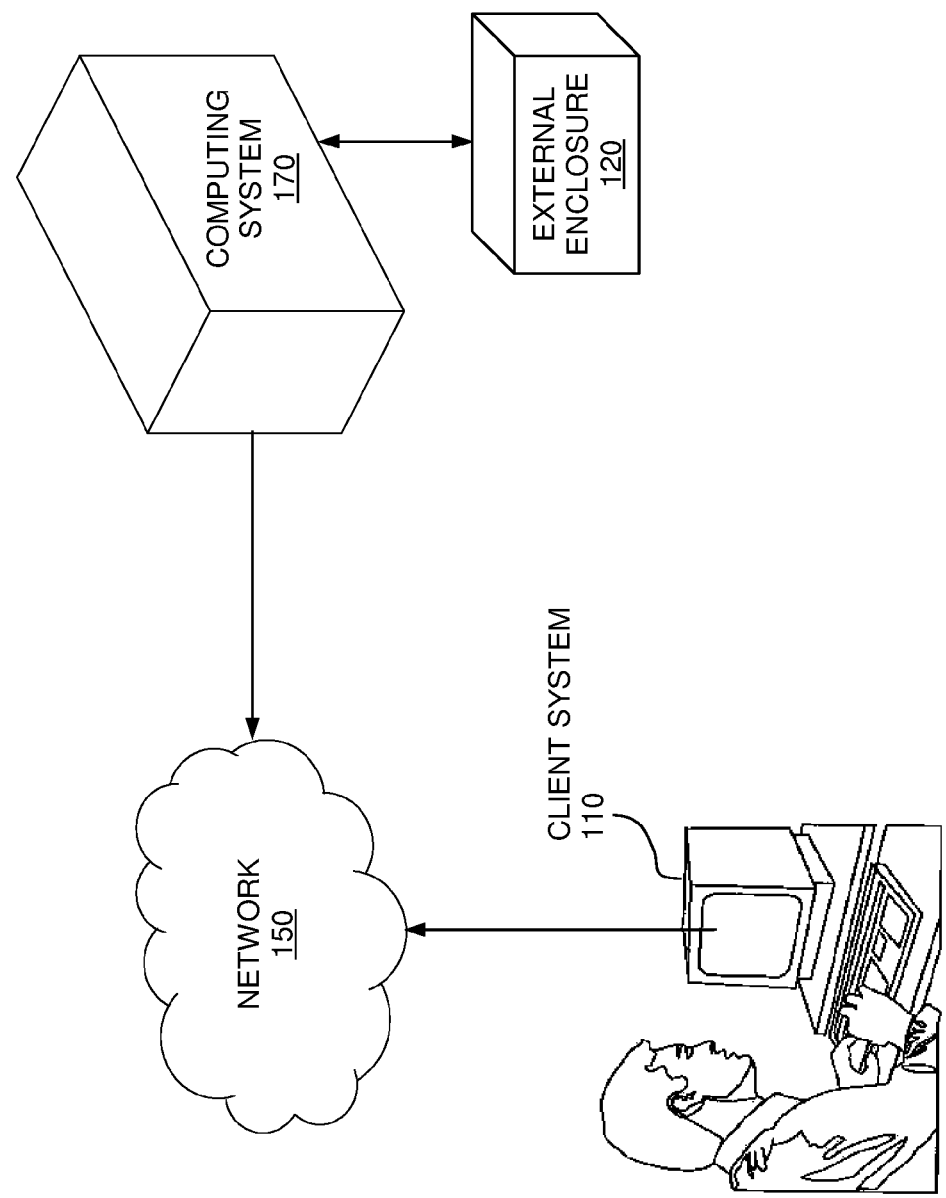

US 8,578,201 B2

CONVERSION OF TIMESTAMPS BETWEEN MULTIPLE ENTITIES WITHIN A COMPUTING SYSTEM

CROSS-REFERENCE TO RELATED APPLICATIONS

This application is a continuation of co-pending U.S. patent application Ser. No. 13/087,106, filed Apr. 14, 2011. The aforementioned related patent application is herein incorporated by reference in its entirety.

BACKGROUND

The present invention generally relates to managing received data from external devices, and more particularly, to converting timestamps associated with the received data to a standard recognized by the receiving computing system.

DESCRIPTION OF THE RELATED ART

Many modern computing systems lack enough expansion slots to satisfy the need for I/O components and additional storage. Accordingly, computer manufactures may offer external I/O enclosures to satisfy this need. These external enclosures, for example, may provide additional I/O expansion slots for any number of hardware components such as an external/internal hard disk, peripheral component interconnect (PCI) card, PCI Express card, video card, or sound card. These hardware components are then connected to the computing systems (via the external enclosure) to expand the capabilities of the computing system. However, these external enclosures may be unable to provide an accurate timestamp when transmitting data to the computing system.

In addition to using the hardware components to expand the capabilities of the computing system, the hardware components may transmit status information to the computer system, such as the component's temperature, type, energy consumption or functionality. If this periodically received status data is displayed to a user to illustrate a trend—e.g., the amount of energy consumed by the hardware component over a period of time—then each received data point needs an accurate timestamp. However, as mentioned above, many external enclosures do not have the capability to determine the precise time of day (TOD) that data was transmitted to a computing system.

SUMMARY

Embodiments of the invention provide a method for converting a timestamp between a computing system and a subsystem of the computing system by receiving a relative timestamp from the subsystem. Once the method determines that a time skew has occurred based on the relative timestamp and a time base, the time base is updated, the time base being a conversion variable for converting the relative timestamp to an absolute timestamp. If the time base is updated, the method determines the absolute timestamp based on the relative timestamp and the updated time base, the absolute timestamp being a timestamp of a time measure used by the computing system. Conversely, if the time base is not updated, the method determines the absolute timestamp based on the relative timestamp and the time base.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 1A-1B are block diagrams illustrating a system for receiving and displaying trending data, according to embodiments of the invention.

DETAILED DESCRIPTION

Figure 1B:
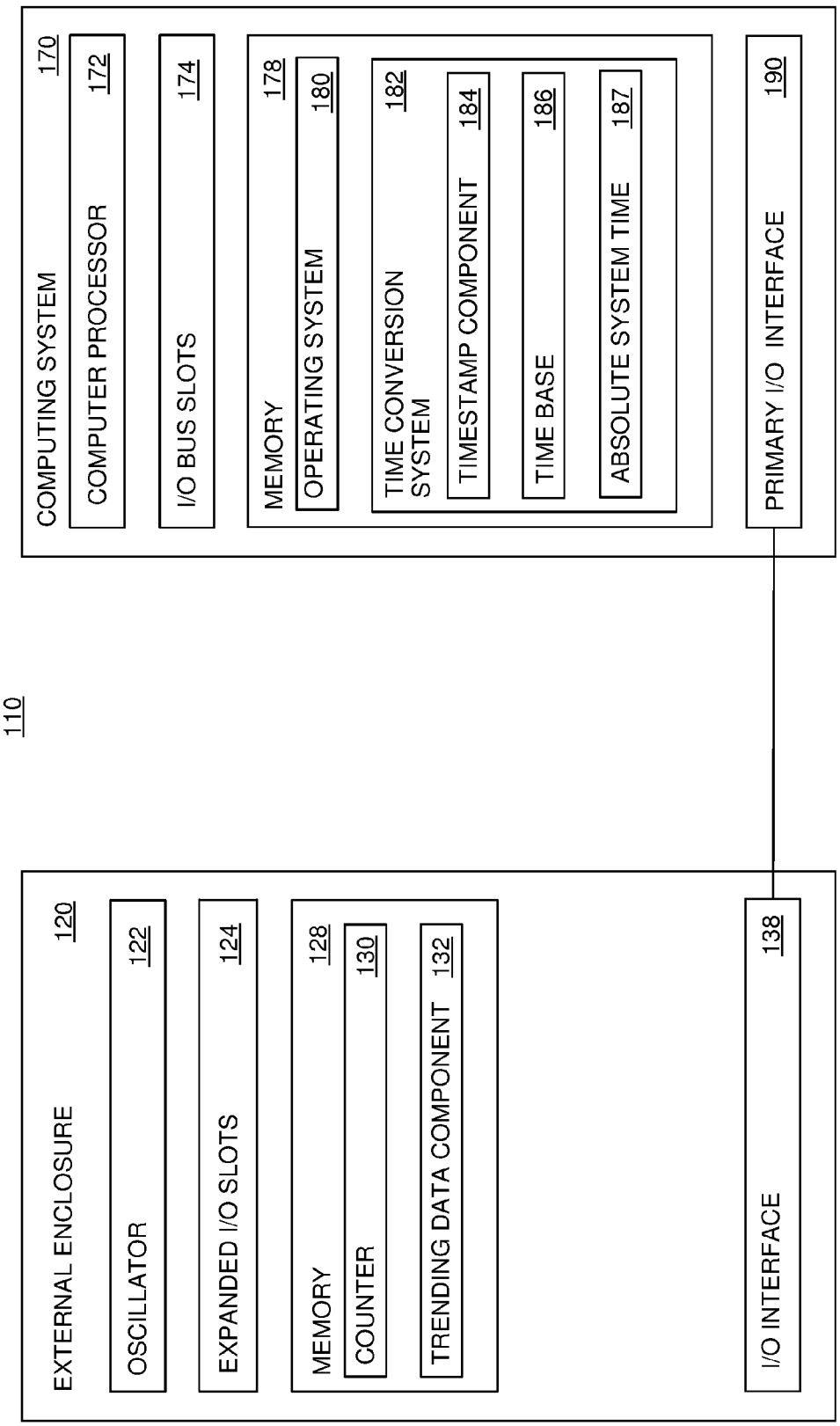

In general, embodiments of the present invention convert a timestamp based on a subjective frame of reference to a timestamp based on a recognized standard. For example, an external I/O enclosure may be attached to a computing system to provide the system with additional I/O capabilities. However, the enclosure (i.e., a separate computing system) may not have the ability to record time according to the actual time of day (TOD)—i.e., the day/month/year and hour/minute/second. Instead, the enclosure may record time according to an event specific to the enclosure such as when it was powered on. Accordingly, any data received from the enclosure will have a timestamp that corresponds to that specific event—i.e., a relative timestamp. The computing system, on the other hand, may be able to obtain the correct TOD from a permanent source. Accordingly, the computing system may convert the received relative timestamp to a timestamp that is based on the actual TOD. Converting an enclosure's timestamps permits the computing system to display received data in a TOD format which is familiar to a user.

To perform the conversion, the computing system establishes a conversion variable (i.e., a time base) which can be used to convert a relative timestamp of subsequently received data from the external enclosure to a timestamp that is relevant to the computing system. In some embodiments, the external enclosure contains a counter which sets the relative timestamp. The time base may also be used to detect whether the counter has reset, wrapped or drifted. Because the external enclosure typically cannot detect when the counter has failed at maintaining an accurate time (i.e., reset, wrapped, or drifted), the computing system updates the time base to ensure that data received before a counter failure may still be correlated (e.g., placed on the same timeline) with data that was received after the failure.

In one embodiment, a computing system receives data from an external I/O enclosure which may contain any number of hardware components. These hardware components expand the capabilities of the computing system by providing additional memory or functions. Because the external enclosure cannot determine the actual TOD, it may record the number of seconds that have passed since the enclosure was powered on—i.e., plugged in. As such, when the enclosure transmits data concerning the status of the hardware components to the computing system, it provides in the data a relative timestamp that discloses how many seconds have elapse since the enclosure was powered on.

Once the computing system receives the data with the timestamp, the system determines if this is the first communication received from the enclosure. If so, the computing system calculates a time base according to the received relative timestamp and the actual time the timestamp was received. This time base may then be used for at least two purposes: (1) to convert subsequently received relative timestamps to absolute timestamps which are correlated to the TOD or to the time measure used by the system (e.g., UNIX™ time) and (2) to detect if a counter on the enclosure fails to provide an accurate relative timestamp when transmitting subsequent updates. Specifically, the computing system detects whether such a failure has occurred using the time base and the actual time that is known to the computing system. If a significant time skew is detected, the time base is recalculated using the new received relative time and the actual time known to the system. In either case, the computing system then adds the appropriate time base to the relative timestamp to yield an absolute timestamp. This absolute timestamp corresponds to the actual TOD that the status data was measured on the hardware component.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access systems (e.g., the external enclosure) or related data available in the cloud. For example, the external enclosure could be located separately from the computing system within the cloud. In such a case, the external enclosure could send the data containing the timestamps which are stored at a computing system in the cloud. Doing so allows a user to gain the benefit of the external enclosure from any computing system attached to a network connected to the cloud (e.g., the Internet).

FIGS. 1A-1B are block diagrams illustrating a system 100 for receiving and displaying trending data, according to one embodiment of the invention. As shown in FIG. 1A, the system 100 includes a client system 110, a network 150, a computing system 170, and an external enclosure 120. In general, the computing system 170 receives data from hardware components located within the external enclosure 120 which provides additional expansion slots and memory capabilities to the computing system 170. The received data may describe the status of hardware components hosted by the external enclosure 120 (e.g., the temperature of the hardware component, energy consumed by the hardware component or the functionality of the component).

Though the external enclosure 120 is shown as being capable of being located separately from the computing system 170, the external enclosure 120 may be located within the computing system 170. Further, any subsystem of the computing system 170 that sends time stamped data, but lacks a real-time clock, may benefit from the techniques described herein. For example, a micro-controller for a power supply of the computing system 170 may lack a real-time clock but need to generate timestamps for updates regarding the temperature or energy consumption of the power supply. Nonetheless, the micro-controller may deliver relative timestamps to the computing system 170 which may then convert the relative timestamps to a time measure used by that system 170.

The data transmitted from the external enclosure 120 to the computing system 170 may include a timestamp relative to an event occurring on the external enclosure 120 which may be used to show a trend in the status of the hardware components—e.g., if the hardware component is consuming more or less energy over a period of time. In one embodiment, the computing system 170 converts the relative timestamps to a timestamp measured relative to a time base of the computing system 170. The converted timestamp is then transmitted—along with the trending data—via the network 150 to the client system 110. The client system 110 can then display the trending data, for example, on a timeline created by the converted timestamps. In one embodiment, the trending data may be displayed on a monitor attached directly to the computing system 170. Moreover, the computing system 170 may use the status of the hardware components and timestamps in IBM®'s Active Energy Manager (AEM) to measure, monitor, and manage the energy consumed by the hardware component. In general, AEM extends the scope of energy management to enable a more complete view of energy consumption within the datacenter and may be used in IBM BladeCenter®, POWER, System x, and System z servers. Nonetheless, one of ordinary skill will recognize that the timestamps discussed herein are not limited to correlating energy management data.

FIG. 1B further illustrates the external enclosure 120 and computing system 170 of FIG. 1A, according to one embodiment of the invention. Illustratively, the external enclosure 120 includes an oscillator 122, expanded I/O slots 124, memory 128 and an I/O Interface 138. The oscillator 122 is a circuit used to measure time—e.g., seconds. Different types of oscillators 122 include LC oscillators, crystal oscillators, and ring oscillator. However, any oscillator may be used which satisfies the description herein. Typically, the oscillator 122 provides a periodic signal once the external enclosure is connected to a power source.

The expanded I/O slots 124 are found on the external enclosure 120 but provide the computing system 170 with additional capabilities. For example, hardware components, such as external/internal hard disk, peripheral component interconnect (PCI) card, PCI Express card, video card, sound card, read only memory (ROM), adapter, flash memory, or other types of volatile and/or non-volatile memory, may be connected to the slots 124. In one embodiment, the expanded I/O slots 124 are treated by the computing system 170 as if they were located internally.

The I/O interface 138 receives and transmits data between the external enclosure 120 and the computing system 170. In one embodiment, this connection is facilitated by Infini-Band™ which is a switched fabric communications link used in high-performance computing and enterprise data centers. The I/O interface 138, however, may be any interface capable of performing the functions described herein.

As shown, the memory 128 includes a counter 130, trending component 132 and relative timestamp 134. The counter 130 detects the periodic signal produced by the oscillator 122. For each cycle of the signal, the counter 130 assigns a specific value of time to that period; for example, one cycle of the signal may correspond to 1/1,000,000 of a second (i.e., 1 MHz). Alternatively, a processor, such as a IBM POWER processor, (not shown) may be included in the external enclosure 120 which has a time-base register that is driven at some multiple of the processor frequency. The counter 130 may use the information stored in the time-base register to derive a relative time. In one embodiment, the counter 130 records the amount of time, typically in seconds, that has passed since the external enclosure was powered on and the oscillator 122 began operating (i.e., a time relative to a specific event on the external enclosure 120). The trending data component 132 receives information from a hardware component (e.g., a PCI card) attached to the expanded I/O slots 124. In one embodiment, the information concerns the status of the hardware components (e.g., the component's temperature, energy consumption or functionality). The trending data component 132 also associates a timestamp for this data by receiving the current count from the counter 130. In one embodiment, this timestamp is based on the time that has elapsed since the external enclosure 120 was powered on, not on the actual TOD. Accordingly, the timestamp assigned using the oscillator 122 is referred to herein as a "relative timestamp." Once the data is collected and associated with a timestamp, the trending data component 132 relays the information to the I/O interface 138 to be transmitted to the computing system 170. This trending data, with its relative timestamps, permits the computing system 170 to identify trends in a hardware component's performance or condition.

The computing system 170 includes a computer processor 172, I/O bus slots 174, memory 178 and a primary I/O interface 190. The computer processor 172 may be any processor capable of performing the functions described herein. The I/O bus slots 174 permit the addition of hardware components similar to the ones described in connection with the expanded I/O slots 124 on the external enclosure 120. The primary I/O interface 190 also connects to the I/O interface 138 of the external enclosure 120 and permits the computing system 170 to transmit data to, and received data from, the external enclosure 120.

The memory 178 of the computing system 170 includes an operating system 180 and a time conversion system 182. The operating system 180 may be any operating system capable of performing the functions described herein. The time conversion system 182 receives the trending data from an external enclosure 120, converts the associated relative timestamp to an absolute timestamp, and may either transmit the trending data with the absolute timestamp to the client system 110 or use the trending data in AEM. As used herein, an "absolute timestamp" generally refers to amount of time elapsed since a fixed reference point (i.e., a specific date). The hardware components of computing system 170 may generally measure time relative to the fixed reference point. In one embodiment, this reference point is fixed according to UNIX™ Time (or POSIX time). In general, adding the absolute timestamp to the reference point yields the TOD that a given timestamp was measured on the external enclosure 120.

The time conversion system 182 includes a timestamp component 184, time base 186 and absolute system time 187. The timestamp component 184 converts received relative timestamps, updates the time base 186 and compares the absolute timestamp (i.e., the converted relative timestamp) to the absolute system time 187. The time base 186 provides a conversion factor used to change a relative timestamp to an absolute timestamp. That is, the first time the time base 186 is established, the time base 186 is the amount of time that has elapsed (also measured in seconds) since the fixed reference point and when the external enclosure 120 was powered on. Accordingly, adding the time base 186 (i.e., the amount of time that has elapse since a fixed reference point and when the enclosure 120 was powered on) to any relative timestamp (i.e., the amount of time that has elapsed since the enclosure 120 was powered and status data was sent) yields the absolute timestamp. In one embodiment, comparing the absolute timestamp to the absolute system time determines if the counter 130 has failed.

In one embodiment, multiple external enclosures 120 may be connected to the computing system 170. In such a case, each enclosure 120 may have a separate time base 186 maintained by the time conversion system 182. Moreover, an external enclosure 120 may have multiple time bases 186 associated with it—i.e., the computing system 170 may use one time base to determine the absolute time for some timestamps but use a different time base when converting subsequently received timestamps. This process will be discussed in greater detail below with FIG. 3A-3D. The absolute system time 187 generally corresponds to an amount of time that has elapsed from the same reference point used to measure the time base 186. For clarity, the relative timestamp, absolute timestamp, time base 186, and absolute system time 187 may be measured in seconds though they are not limited to such.

Figure 2:
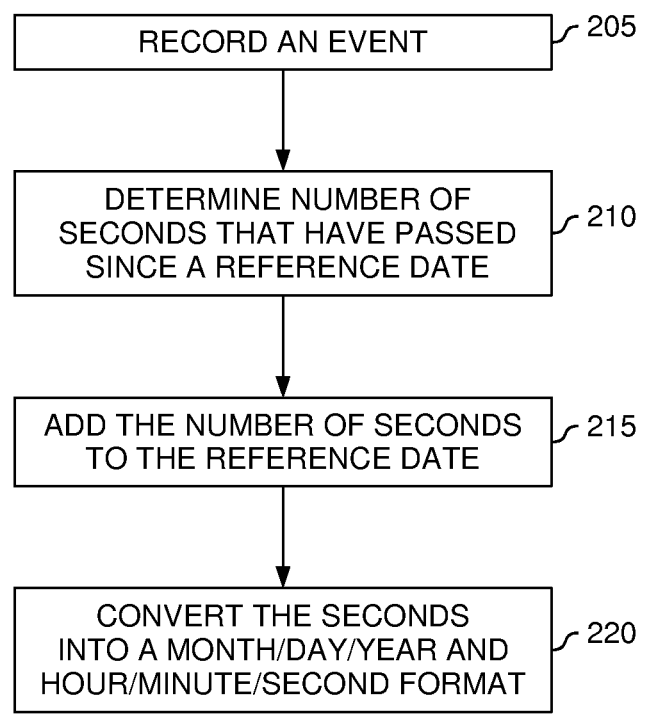
FIG. 2 is a flow chart illustrating a process which converts UNIX™ time to a TOD format, according to embodiments of the invention

FIG. 2 is a flow chart illustrating a process to convert the number of seconds that have elapsed from a reference point to a TOD format, according to embodiments of the invention. The UNIX™ Time Standard uses a reference point of Jan. 1, 1970. Any computing system 170 that follows this standard calculates the number of seconds that have passed since Jan. 1, 1970. As shown in FIG. 2, this process 200 begins at step 205 by the occurrence of an event. In one embodiment, the event may be the hardware components sending updated status information to the trending data component 132, or the timestamp component 184 receiving the status information from the external enclosure 120. At step 210, the numbers of seconds that have elapsed since Jan. 1, 1970 is calculated. At step 215 the number of seconds is added to Jan. 1, 1970. To change the format to a TOD, at step 220, the combined time is then converted to the appropriate day/month/year and hour/minutes/seconds. Advantageously, any two computing systems that use the UNIX™ Time Standard can timestamp transmitted data with the number of seconds that have elapsed since Jan. 1, 1970, and the recipient will know precisely the TOD that the timestamp occurred. Table 1 illustrates several examples of UNIX™ time measurements (e.g., absolute timestamps or absolute system time 187) and the corresponding TOD formats.

TABLE 1

| Seconds Elasped from Reference Date | Absolute Date in M/D/Y and H/Min/Sec Format |
|---|---|
| 418978800 seconds | Apr. 12, 1983 at 7:00:00 |
| 1223637315 seconds | Oct. 10, 2008 at 11:15:15 |
| 1234567890 seconds | Feb. 13, 2009 at 23:31:30 |

Now that the concept of UNIX™ time has been introduced, the relationship between the time base 186, relative timestamp, absolute timestamp, and absolute system time 187 may be explored further.

Figure 3A:
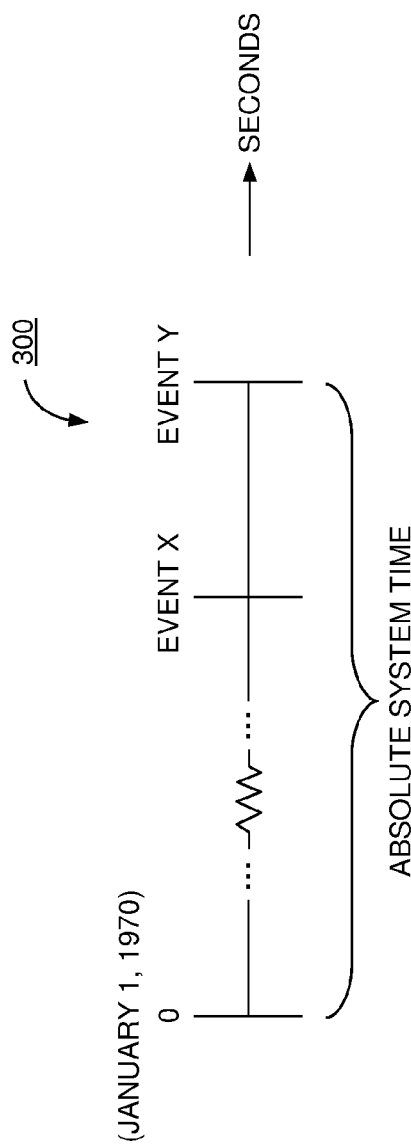
FIGS. 3A-3D are a series of timelines illustrating the relationship of UNIX™ time variables, according to embodiments of the invention.

FIG. 3A-3D are a series of timelines illustrating the relationship of UNIX™ time variables, according to one embodiment of the invention. FIG. 3A is a timeline illustrating UNIX™ time, according to embodiments of the invention. As shown, the timeline 300 begins at Jan. 1, 1970—the reference point for the UNIX™ Time Standard—and records the events of X and Y. In one embodiment, Event X is when the external enclosure 120 is powered on and the counter 130 begins to count based on the oscillator 122. Event Y is the moment that the trending data component 132 generates a relative timestamp for a status update which is transmitted to the computing system 170. As shown, the relative timestamp is the number of seconds that have elapsed since Event X (e.g., the number of seconds between Event X and Y). For simplicity, assume that the computing system 170 receives the status data instantaneously—i.e., transmitting the data does not create latency. The absolute time is the number of seconds that have passed between Jan. 1, 1970 and Event Y. The absolute system time 187 is the known UNIX™ time for the computing system 170 which, in this embodiment, is the same as the absolute time for Event Y. Note that when the computing system 170 receives the first communication from external enclosure (Event Y), the computing system 170 is unaware of when the external enclosure 120 was powered on—i.e., the computing system 170 has not yet established a time base 186 for the enclosure 120.

Figure 3B:
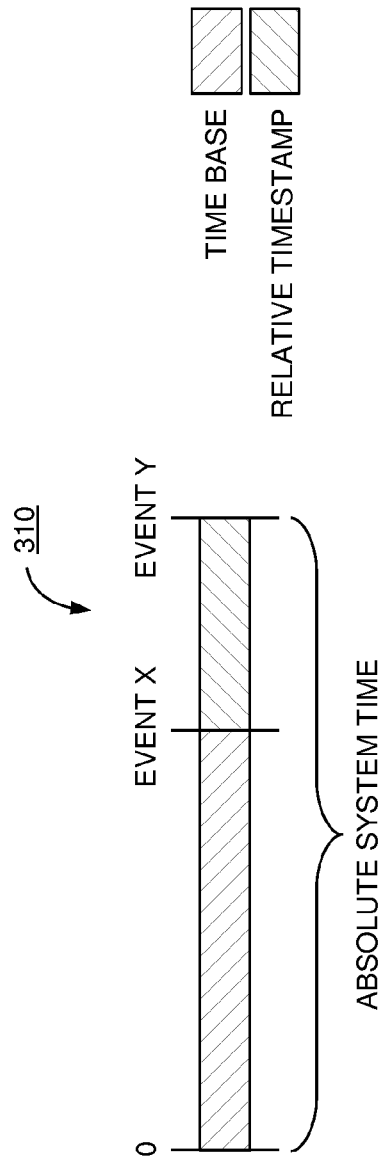

FIG. 3B is a timeline illustrating setting a conversion variable, according to one embodiment of the invention. As discussed above, the time base 186 provides a conversion factor for converting a relative timestamp to an absolute timestamp. As shown in FIG. 3B, the computing system 170 subtracts the first received relative timestamp from the absolute system time 187. Doing so yields the time base 186, i.e., yields the time that has elapsed from the reference date and when the external enclosure 120 was powered on (Event X). Again, assuming no latency, the relative timestamp is the seconds that have elapsed from Event X and when the computing system 170 received the status data (Event Y).

Figure 3C:
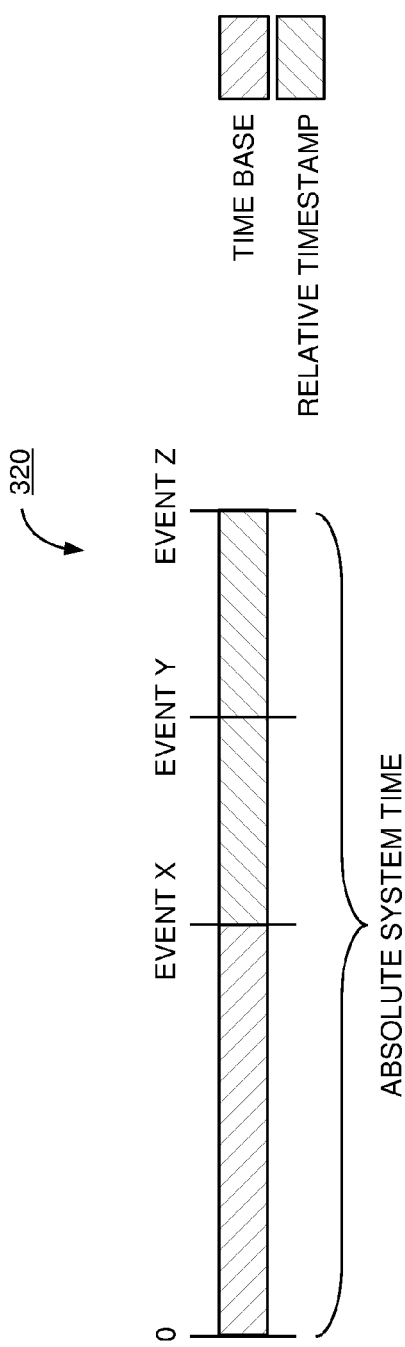

FIG. 3C is a timeline illustrating the use of a conversion variable to identify an absolute time, according to one embodiment of the invention. In FIG. 3C, the computing system 170 receives a second status update from the external enclosure 120 (Event Z). Because the counter 130 on the external enclosure 120 continually increases, the relative timestamp for Event Z provides the number of seconds that have passed since Event X. The time conversion system 182 adds the time base 186 to the new relative timestamp to determine the absolute time for the transmitted data. Because the computing system 170 may use the UNIX™ Time Standard, the absolute time may be converted to a TOD format using the process described above with reference to FIG. 2.

Note, the absolute time for Event Z may have been calculated without storing the time base 186 established in FIG. 3B in memory 178. For example, the time conversion system 182 may use the absolute system time 187 corresponding to when the data was received to determine the absolute timestamp. However, this ignores any latency issues which may cause several updates to be received in a relatively short period of time even though they were measured on the hardware components over a much longer period of time. Moreover, the external enclosure 120 may wait to send status data in chunks. For example, the trending data component 132 may buffer status data and send several updates at once. Accordingly, without the relative timestamp and the time base 186, the time conversion system 182 is unable to determine at what absolute time each update was measured by the hardware component.

Figure 3D:
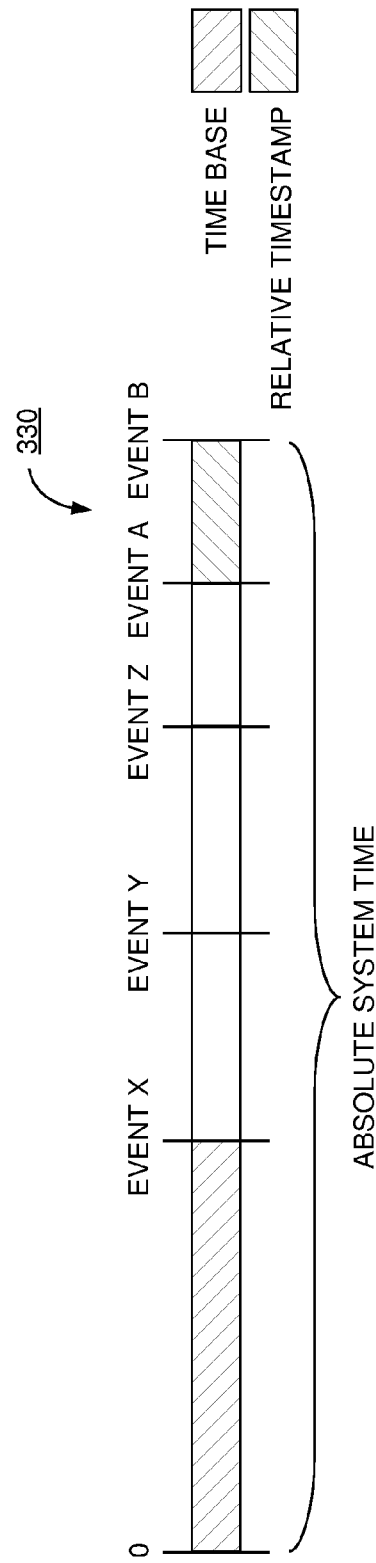

FIG. 3D is a timeline illustrating a failure in the relative timestamp, according to embodiments of the invention. As shown in FIG. 3D, the computing system 170 has already used the first received relative timestamp to create the time base 186. However, at Event A, the counter 130 fails. The ability of the trending data component 132 to use the counter 130 to generate relative timestamps may fail for at least three reasons: (1) the counter 130 has reached its greatest value and has wrapped (e.g., a two byte counter 130 has a maximum value of 0xFFFF and will wrap to 0x0000) (2) the power to the external enclosure has been interrupted and caused the counter 130 to reset and (3) a poor quality oscillator 122 may drift and fail to accurately record the chosen unit of time (e.g., seconds). As used herein, "failure" may refer to any of these occurrences, and thus, does not necessary imply that the counter 130 has reset.

Returning to FIG. 3D, at Event A the counter (i.e., the relative time) 130 fails. At Event B, the computing system 170 receives additional status data from the hardware components. As shown, adding the time base 186 to the new relative timestamp, however, ignores the time that has elapsed between Event X and Event A. Now, the computing system 170 can no longer correlate the three separate updates (i.e., Event Y, Z and B) because of the counter failure which occurred between Event Z and B. The time conversion system 182 should detect this failure and adjust the time base 186 for Event B accordingly. Stated differently, the time conversion system 182 will use a different time base 186 to determine the absolute time for Event B than for Event Y and Z—i.e., multiple time bases are associated with the external enclosure 120. This process of maintaining and updating a time base 186 is shown by FIG. 4.

Figure 4:
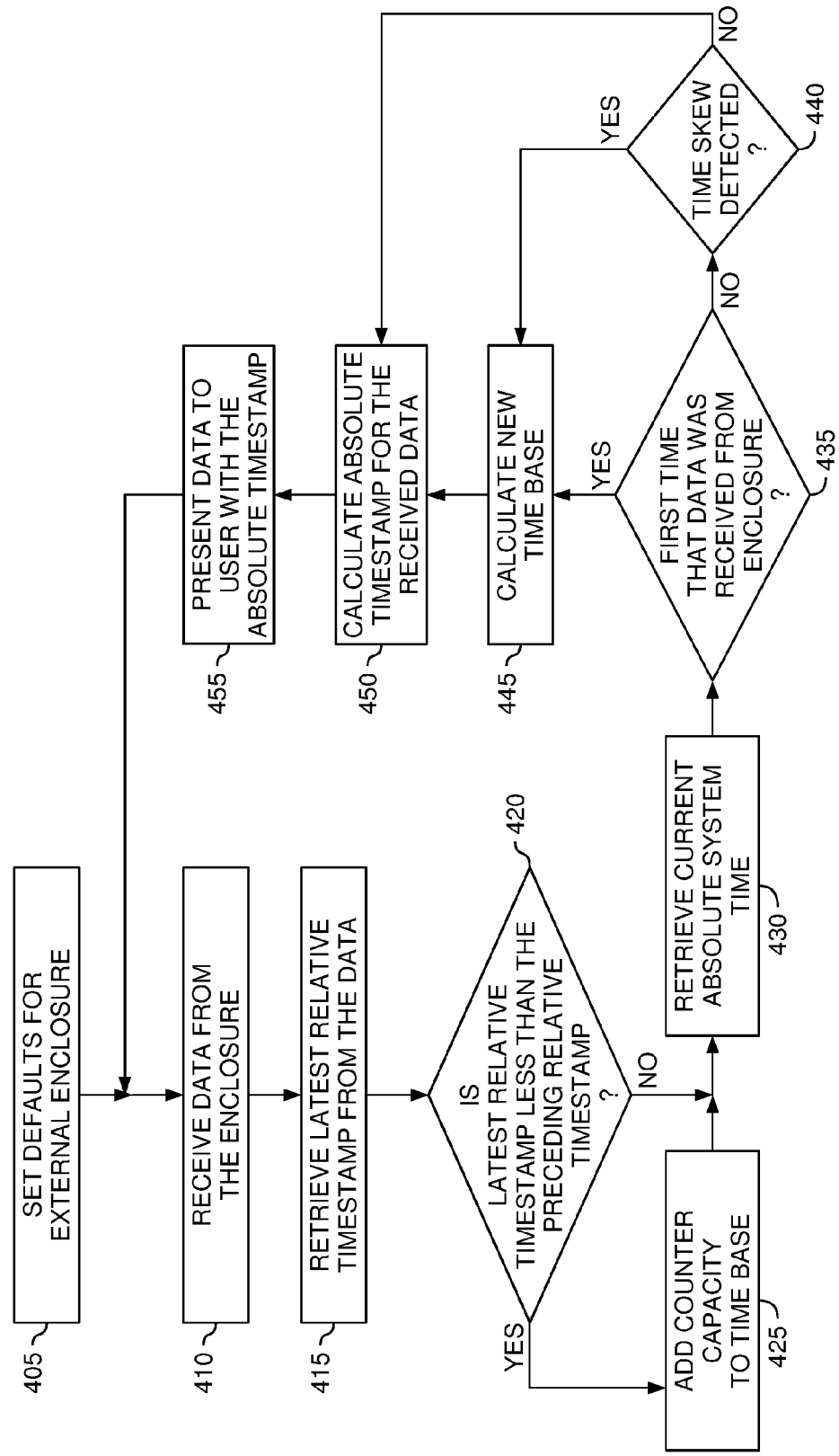
FIG. 4 is a flow chart illustrating the conversion of a received relative timestamp to an absolute timestamp, according to embodiments of the invention.

FIG. 4 illustrates a method for converting a received relative timestamp to an absolute timestamp, according to one embodiment of the invention. At step 405, the default values for the variables stored at the computing system 170 for an external enclosure 120 are set. In one embodiment, the default values set the time base 186 to zero. The oscillator 122 on the external enclosure 120 begins to operate as soon as the enclosure 120 is powered. In one embodiment, the external enclosure 120 does not have access to an outside source that may be used to sync its oscillator 122 to the current time (i.e., a real-time clock). Instead, the counter 130 records the amount of time that has passed since the oscillator 122 began operation, or if the counter was reset or wrapped, the amount of time that has passed since then.

At step 410, the computing system 170 waits for trending data from the hardware components attached to the expanded I/O slots 124 of the external enclosure 120. This trending data includes the status of the components (i.e., temperature, energy consumption, functionality and the like) and a relative timestamp. In one embodiment, trending data component 132 associates a relative timestamp with the trending data for each hardware component. In general, the relative timestamp provides the time conversion system 182 on the computing system 170 when the trending data was measured on the hardware component.

The trending data component 132 then uses the I/O interface 138 to relay the trending data and the relative timestamp to the computing system 170. Typically, latency in communications results in the computing system 170 receiving either multiple updates from a single hardware component or multiple updates associated with separate hardware components. In either case, at step 415, the computing system 170 processes the trending data using the time conversion system 182.

At step 420, the timestamp component 184 determines whether the received timestamp is less than the preceding relative timestamp. Stated differently, the timestamp component 184 determines if time appears to be moving backwards. As an example, assume that the counter 130 is limited to two bytes and the last received relative timestamp was 0xFFFA. Subsequently, the timestamp component 184 receives additional trending data with a relative timestamp of 0x0003, signifying that the counter 130 has wrapped. Accordingly, at step 425, the capacity of the counter 130 (in the previous example, this is 0x10000) is added to the time base 186. In one embodiment, the counter capacity may not be known to the timestamp component 184. In such as case, the timestamp component 184 communicates with the external enclosure 120 to determine the counter capacity before ascertaining whether the counter 130 has wrapped. Nonetheless, adding the capacity of the counter 130 to the time base 186 overcomes the effects of a limited capacity counter.

At step 430, the timestamp component 184 determines the absolute system time 187. In one embodiment, the absolute system time 187 is the number of seconds that have elapsed since Jan. 1, 1970 (i.e., UNIX™ Standard Time) and when the timestamp component 184 receives the trending data from the external enclosure 120. As mentioned above, the external enclosure 120 may transmit trending data with various relative timestamps, or latency may cause several updates to arrive at once. If multiple updates were assigned the same absolute system time 187 as their absolute timestamp, the status data may be clumped together rather than spread out evenly based on the time the updates were measured on the hardware components. Though the timestamp component 184 does not use the absolute system time 187 to convert the relative timestamps, because the counter 130 may fail, the timestamp component 184 does compare the relative timestamps with the absolute system time 187 to detect a counter 130 failure.

At step 435, if the trending data is the first data received from the external enclosure 120, the time base 186 should be calculated. Each external enclosure 120 has at least one time base 186 associated with the trending data received from that enclosure 120. In one embodiment, a plurality of external enclosures may be connected to the computing system 170. Because these enclosures may have been powered on at different times, the time base 186 for each may be different. Moreover, different trending data received from the same external enclosure 120 may be associated with different time bases 186. For example, referring again to FIG. 3D, Events Y and Z (i.e., received trending data) are associated with the labeled time base; however, because of the counter failure, Event B must be associated with a different (or updated) time base 186 to be correctly correlated to Event Y and Z.

The timestamp component 184 uses the correlation between the relative timestamp and the absolute system time 187 to determine whether a time skew has occurred. In general, a time skew occurs whenever the counter 130 experiences a failure (e.g., clock drift, power failure or wrapping multiple times). But it may also arise because of latency between the external enclosure 120 and computing system 170. Specifically, the timestamp component 184 adds the time base 186 to the relative timestamp of received data to create a predicted absolute time. This predicted absolute time is then compared to the correlated absolute system time 187. If the predicted time is within a pre-determined delta (i.e., a threshold value) of the absolute system time 187, then the timestamp component 184 may assume that a failure did not occur. For example, if the time base 186 plus a received relative timestamp yields a predicted absolute time of 0x50010000 seconds while the absolute system time 187 is 0x50030000 seconds and the delta is sixty seconds, then the timestamp component 184 detects that a time skew has occurred (in this case, a two-byte counter 130 has probably wrapped twice). Note that the timestamp component 184 does not need to distinguish between the different types of failures. As a further example, assume that the pre-determined delta is sixty seconds and that the predicted absolute time is sixty-two seconds off from the absolute system time 187. This difference could have been caused be either a poor oscillator (i.e., drift) or latency. In general, the pre-determined delta determines the sensitivity of the time conversion system 182 to all types of failures. As such, the smaller the delta, the more likely a time skew will be detected. In one embodiment, however, the timestamp component 186 may determine the type of failure and use a customized delta for each type.

At step 445, the timestamp component 184 calculates a new time base 187 if it detects either that this is the first time that data was received from the external enclosure, or a time skew occurred. In either case, the timestamp component 184 subtracts from the absolute system time 187 the relative timestamp to yield the new time base 186.

At step 450, the absolute timestamp for the trending data is calculated. Because the timestamp component 184 now has the correct time base 186, this time base 186 is added to the relative timestamp associated with the trending data to give the absolute timestamp. In one embodiment, an absolute timestamp measured in UNIX™ time, which is typically recorded in seconds, and may be converted to give a TOD format. At step 455, this format may then be displayed on a client system 110 to illustrate the trending data. Alternatively, the trending data and the absolute timestamp may be used in AEM to measure, monitor and manage the energy consumed by the hardware component. Following step 455, the process returns to step 410 to wait for additional trending data.

In another embodiment, the timestamp component 184 may receive multiple updates with relative timestamps. To supplement the process discussed in FIG. 4, the timestamp component 184 may evaluate the multiple updates together. In one embodiment, the trending data component 132 may send multiple updates to the computing system 170 which may include both new and old updates—i.e., the trending data component 132 sends whatever updates are still stored in its buffer regardless of whether the updates have been sent previously. Accordingly, the timestamp component 184 may evaluate the received data points and determine if it has processed any of the data points before. If so, then it is unlikely that the counter 130 has wrapped multiple times since the received updates still contain old information. Conversely, if the received data points consist of entirely new updates, then the timestamp component 184 may decide to recalculate the time base 186 on the assumption that some failure has occurred.

In one embodiment, the time conversion system may store both the old and new time base 186 for an external enclosure 120. For example, in a situation where the timestamp component 184 simultaneously processes multiple data points from an enclosure 120, assume that one data point has a relative timestamp of 0xFFFE seconds and another data point has a relative timestamp of 0x0003 seconds. In this case, the timestamp component 184 detects that the counter 130 has wrapped, and for every data point with a relative timestamp within a pre-determined delta of 0xFFFE seconds, the old time base is used to calculate the absolute timestamp, but for every data point with a relative timestamp within a pre-determined delta of 0x0003 seconds the new time base is used.

Advantageously, embodiments of the invention allow a computing system to reconcile the relative timestamps associated with hardware in an external enclosure with an absolute time reference (e.g., UNIX™ time). Doing so allows an external enclosure to transmit data with an associated timestamp based on an independent event that may be converted to the absolute time reference. Accordingly, the converted timestamps may be used to organize the transmitted data to identify trends.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of converting a timestamp between a computing system and a subsystem of the computing system, comprising:
   receiving a relative timestamp from the subsystem;
   upon determining that a time skew has occurred based on the relative timestamp and a time base, updating the time base by operation of one or more computer processors, wherein the time base is a conversion variable for converting the relative timestamp to an absolute timestamp,
   upon determining that the relative timestamp is a first communication from the computing system, establishing the time base by subtracting the relative timestamp from an absolute system time, wherein the absolute system time is a time measure used by computing system and indicates when the relative timestamp was received,
   if the time base is updated, determining the absolute timestamp based on the relative timestamp and the updated time base, wherein the absolute timestamp is a timestamp of a time measure used by the computing system; and
   if the time base is not updated, determining the absolute timestamp based on the relative timestamp and the time base.

2. The method of claim 1, wherein determining that the time skew has occurred comprises,
   adding the time base to the relative timestamp to yield a predicted time of transmission; and
   determining whether the predicted time of transmission is within a pre-defined delta from an absolute system time, wherein the absolute system time is a timestamp of the time measure used by computing system and indicates when the relative timestamp was received.

3. The method of claim 1, wherein updating the time base comprises subtracting the relative timestamp from an absolute system time, wherein the absolute system time is a timestamp of the time measure used by computing system and indicates when the relative timestamp was received.

4. The method of claim 1 wherein adding the relative timestamp to the time base yields the absolute timestamp.

5. The method of claim 1, further comprising receiving, with the relative timestamp, received data that includes at least one of the following: a temperature of a hardware component in the subsystem and an energy consumed by the hardware component in the subsystem.

6. The method of claim 1, further comprising,
   determining whether a counter has wrapped based on a first relative timestamp and a second relative timestamp, wherein the counter generates both of the relative timestamps; and
   upon determining the counter has wrapped, adding a greatest value that can be stored by the counter to the time base.

7. The method of claim 1, wherein the subsystem is an external enclosure that provides connections for hardware components, the hardware components expanding the computational abilities of the computing system.

* * * * *